May 8, 1962 — R. E. GRANTHAM ETAL — 3,034,115
MISS DISTANCE TELEMETERING SYSTEM
Filed Sept. 4, 1958 — 4 Sheets-Sheet 1

$V_a = |\vec{V_a}|$
$V_p = |\vec{V_p}|$

POSSIBLE INTERSECTION POINTS

INVENTORS.
R. E. GRANTHAM, S. J. RAFF
H. C. HOFFMAN JR., P. YAFFEE
S. B. PULLIAM

BY
ATTYS.

May 8, 1962 R. E. GRANTHAM ET AL 3,034,115
MISS DISTANCE TELEMETERING SYSTEM
Filed Sept. 4, 1958 4 Sheets-Sheet 2
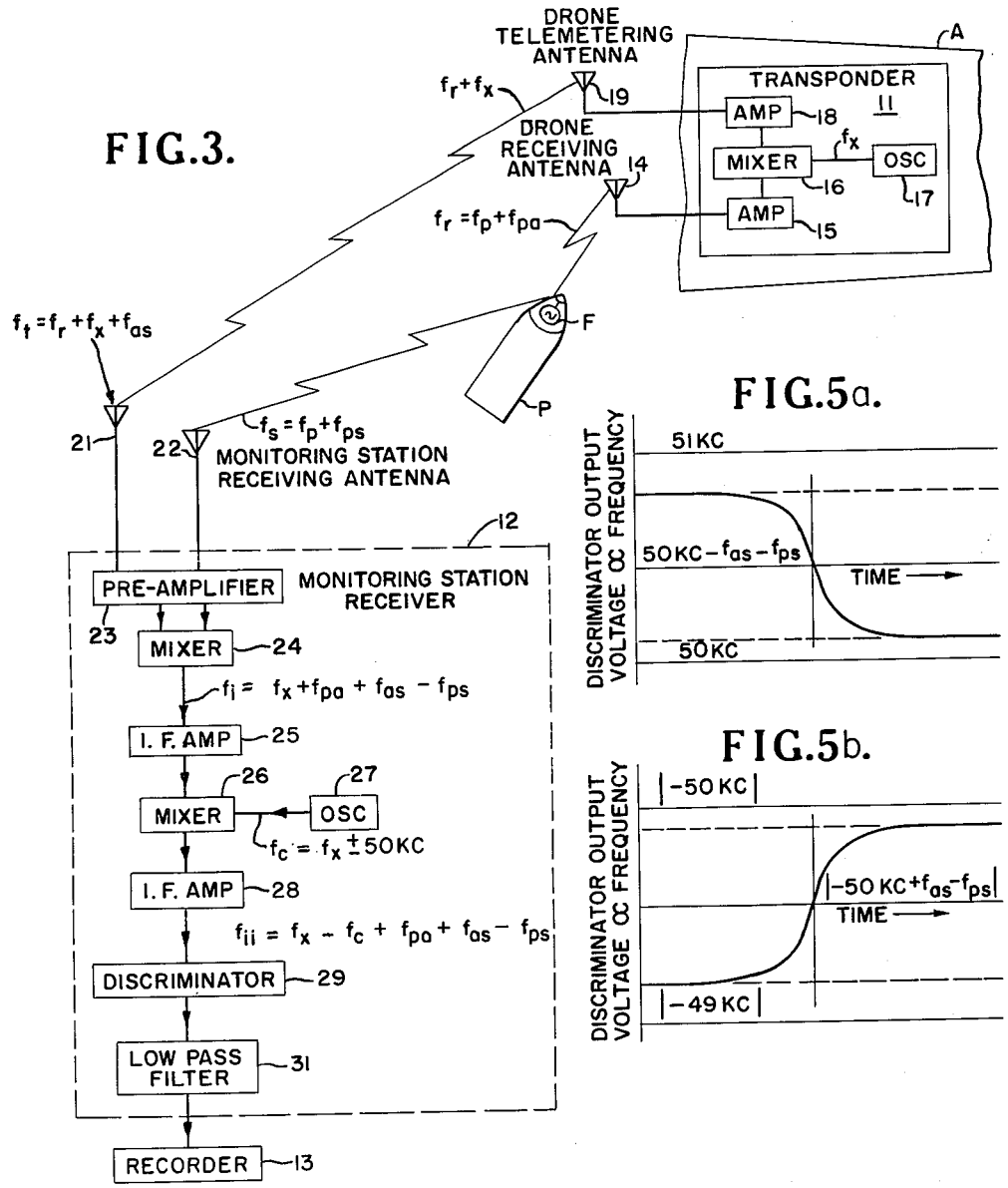
INVENTORS.
R. E. GRANTHAM, S. J. RAFF
H. C. HOFFMAN Jr., P. YAFFEE
S. B. PULLIAM
BY
ATTYS.

May 8, 1962 R. E. GRANTHAM ETAL 3,034,115
MISS DISTANCE TELEMETERING SYSTEM
Filed Sept. 4, 1958 4 Sheets-Sheet 3

INVENTORS.
R. E. GRANTHAM, S. J. RAFF
H. C. HOFFMAN Jr., P. YAFFEE
S. B. PULLIAM

BY
ATTYS

3,034,115
MISS DISTANCE TELEMETERING SYSTEM
Rodney E. Grantham, Bethesda, Samuel J. Raff, Silver Spring, Henry C. Hoffman, Jr., Catonsville, Samuel B. Pulliam, Silver Spring, and Philip Yaffee, Kensington, Md., assignors to the United States of America as represented by the Secretary of the Navy
Filed Sept. 4, 1958, Ser. No. 759,106
19 Claims. (Cl. 343—6)
(Granted under Title 35, U.S. Code (1952), sec. 266)

The invention described herein may be manufactured and used by or for the Government of the United States of America for governmental purposes without the payment of any royalties thereon or therefor.

This invention relates generally to radio communication systems, and more particularly to a radio telemetering system especially suitable for transmitting information indicative of the instantaneous relative distance between two moving vehicles.

More specifically, the instant invention contemplates a radio telemetering arrangement for transmitting from a moving aircraft to a remote monitoring position, which itself may be moving relative to the aircraft, a Doppler frequency signal received by the aircraft from a proximate moving source of electromagnetic energy, such as a projectile, missile, or rocket having a proximity fuze or other similar electromagnetic signal source mounted thereon, indicative of the miss distance and relative velocity existing between the aircraft and the moving source.

Although in the field of ordnance evaluation analysis many systems have been devised for determining the miss distance between a launched projectile and an aerial target, such for example as optical viewing systems, acoustic systems which measure the intensity of the shock wave transmitted from the projectile to an aircraft mounted transducer, and scanning lock on radio receiver system, none of these prior art systems has been found to be entirely satisfactory for proximity fuzed projectile evaluation studies. In general, the optical viewing systems have been overly complicated, lacking in accuracy, and limited to daytime use; the acoustic systems have been difficult to calibrate for all conditions of temperature, humidity, etc.; while, the automatic scanning receiver systems have lacked the broad-band characteristics necessary for interception of the wide diversity in the radiated signal frequency of proximity fuzes from divers production lots. In addition, the scanning lock-on receivers have been found unsuitable for rapid firing, or launching rate, studies.

Accordingly, a principal object of the instant invention is to provide a new and improved relatively simple and accurate radio telemetering system.

Another object of the present invention is the provision of a new and improved communications system for proximity fuze miss-distance evaluation studies.

A further object of this invention resides in the provision of a new and improved communication system for providing the information necessary for the determination of the miss-distance and relative velocity between a pair of moving airborne vehicles.

A still further object of the present invention is to provide a new and improved firing error indicating system.

Another still further object of this invention is to provide a telemetering system capable of indicating the miss distance between a target and a plurality of sequentially launched vehicles.

Other objects and many of the attendant advantages of the instant invention will be readily appreciated as the same becomes better understood by reference to the following detailed description when considered in connection with the accompanying drawings, wherein:

FIG. 3 is a block diagrammatic view of a single channel embodiment of the instant invention;

FIGS. 5a and 5b are graphical illustrations of the recorded Doppler curve for divers transmitting frequencies;

Figure 1:
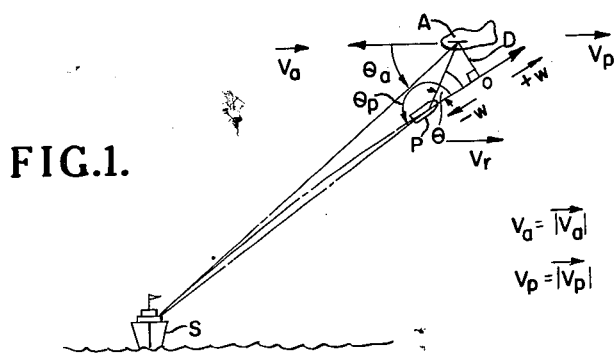
FIG. 1 is a geometric illustration of the underlying mathematical principles of the present invention.

Referring now to the drawings wherein like reference characters indicate like parts throughout the several views, and more particularly to FIG. 1 whereon is shown the geometric relationship between the launching ship S, the target or drone, aircraft A, and the launched projectile P having a proximity fuze F arranged therein. Assuming the proximity fuze to be radiating a signal having a frequency $f_p$ into free space, the signal intercepted by a wing tip antenna of an aircraft A will have a frequency $f_r$ of $$f_r = f_p + \frac{V_r}{\lambda p} \cos \theta$$

wherein $V_r$ is the magnitude of the relative velocity vector between the aircraft and projectile, $\theta$ is the angle between the line from projectile to target and the relative velocity vector, $\lambda p$ equals $c/f_p$ where $c$ is the velocity of light. The Doppler frequency shift $f_{pa}$ resulting from the relative velocities of the moving target and the projectile can be indicated by the equation $$f_{pa} = \frac{V_r}{\lambda p} \cos \theta$$

in which, from a geometrical consideration $$\cos \theta = \frac{-u}{\sqrt{u^2 + D^2}}$$

If the origin for the $u$ coordinate is placed at the point, $o$, of closest approach between the target and the projectile and assuming a constant velocity of the aircraft drone A and projectile P during the instantaneous intercept period, the $u$ coordinate may be indicated as $$u = V_r(t - t_d)$$

in which $t_d$ is the time at which the projectile reaches the point of closest approach; namely $o$. Substituting for $\cos \theta$ in the equation for the Doppler frequency shift, $f_{pa}$, there results $$f_{pa} = -\frac{V_r}{\lambda p} \cdot \frac{V_r(t - t_d)}{\sqrt{V_r^2(t - t_d)^2 + D^2}}$$

in which D is the distance of the projectile from the wing tip antenna of the aircraft at the point of closest approach.

Figure 2:
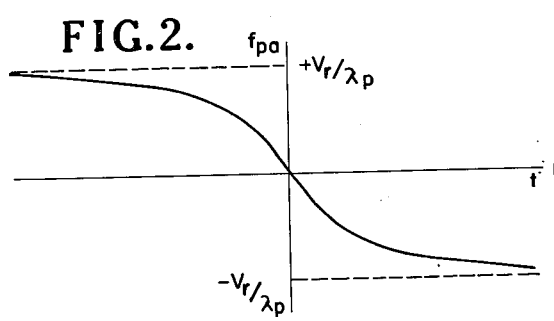
FIG. 2 is a graphical illustration of a Doppler frequency signal plot associated with FIG. 3.
Figure 4:
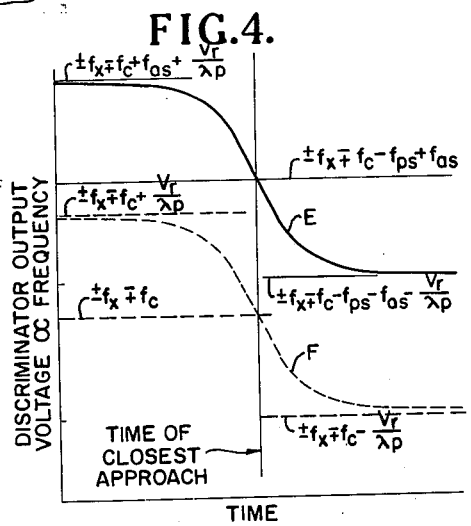
FIG. 4 is a graphical illustration of the biasing effect of the Doppler signal plot of FIG. 2.

A plot of the Doppler frequency shift signal, $f_{pa}$, relative to time received at the target aircraft is shown in FIG. 2 wherein the trace cross-over point indicates the time of closest approach $t_d$. It will be apparent to one skilled in the art that inasmuch as the Doppler frequency shift signal $f_{pa}$ impinging upon the aircraft is correlative to the miss distance D and the relative velocity $V_r$ the magnitudes of these factors may be analytically determined from a record of the signal $f_{pa}$.

Telemetering systems for effecting the practical utilizations of the mathematical basis hereinbefore set forth for miss distance measurements will now be disclosed.

Referring now more specifically to FIG. 3, a miss distance telemetering system according to the instant invention is shown as including a transponder unit 11 mounted in an aircraft A adapted to receive the electromagnetic signal $f_p$ emanating from the proximity fuze F of the launched projectile P, and an FM receiver 12 and recorder, or curve plotter 3 located at a remote monitoring station, such as the launching ship S. The airborne transponder 11 includes a receiving antenna 14 for intercepting a signal $f_r$ impinging thereupon from the projectile fuze. As set forth hereinbefore, the intercepted signal $f_r$ includes the frequency signal $f_p$ generated by the proximity fuze F and the Doppler shifted frequency $f_{pa}$. The received signal $f_r$ is fed through a tuned amplifier 15, having by way of example a band-pass of 10 megacycles, to a mixer stage 16 wherein the received signal is mixed with a fixed frequency signal $f_x$, for example of 70 megacycles, provided by a stable, crystal oscillator 17. The output signal of the mixer, consisting of sidebands $f_r \pm f_x$, is fed to a tuned output amplifier 18, also having by way of example a 10 megacycle band-pass, for translating only one sideband signal to the transponder transmitting antenna 19. In order to simplify the operational description, it will be assumed that the upper sideband signal $f_r + f_x$ is transmitted.

The FM receiver 12 includes a pair of selectively tuned receiving antennas 21 and 22 for respectively receiving the sideband signal $f_t$ radiated from the transponder antenna 19; namely, $f_r + f_x$, and a signal $f_s$ from the projectile proximity fuze F. Although two tuned antennas are illustrated, it will be obvious to one skilled in the art that a solitary helical broad band antenna may also be utilized. In view of the time varying propagation paths, namely, between the ship S and aircraft A and ship S and projectile P, a Doppler shift frequency is introduced into each of the signals $f_s$ and $f_t$ received by the receiver 12. A consideration of the geometric layout of FIG. 1 indicates the Doppler frequency shift between the aircraft and ship $f$ as to be given by the relationship, $$f_{as} = \frac{V_a}{\lambda a} \cos \theta a$$

and the Doppler frequency shift between the projectile and the ship $f_{ps}$ to be given by the relationship, $$f_{ps} = \frac{V_p}{\lambda p} \cos \theta p$$

wherein $V_a$ and $V_p$ are the magnitudes of the aircraft and projectile velocity vectors, respectively; $\theta_a$ and $\theta_p$ are the angles between $V_a$ and ship-aircraft line of sight and between $V_p$ and ship-projectile line of sight, respectively; and $\lambda a$ and $\lambda p$ are the wave lengths of the electromagnetic wave signals transmitted from the airborne transponder 11 and projectile fuze F, respectively. The algebraic sign of the signal $f_{as}$ is a function of the approach or departure of aircraft A relative to station S while the sign of $f_{ps}$ depends on the motion of the projectile P to station S. Although it may seem that the addition of the Doppler frequencies $f_{as}$ and $f_{ps}$ to $f_{pa}$ the Doppler frequency component containing the miss distance information, would introduce error, it has been determined empirically that the additional Doppler frequency components may be regarded as constants for any particular projectile-target intercept, and merely operates to bias the recorded Doppler curve E relative to the Doppler frequency signal F if the two additional Doppler frequency components were not present, or eliminated.

The signals $f_s$ and $f_t$ received by antennas 21 and 22 are fed through a broad band pre-amplifier stage 23 to first mixer stage 24. Unlike conventional FM receivers wherein a received signal is heterodyned down to a preselected intermediate frequency with an internal local oscillator, the difference, or intermediate, frequency output of mixer 24 is dependent upon heterodyning between the signal received directly from the projectile fuze F; namely, $f_s$, and the telemetered signal from the airborne transponder 11, namely, $f_t$. The intermediate frequency output signal $f_i$ from the first mixer, which may be indicated mathematically by the equation $$f_i = f_x + f_{pa} + f_{as} - f_{ps}$$

is transmitted through an I.F. amplifier 25 to a second mixer stage 26. Since in practice, the variation of the sum of $f_{pa} + f_{as} - f_{ps}$ is on the order of 1 kc.s., amplifier 25 can be tuned to a narrow band pass about the frequency $f_x$, or to 70 mc.s. A stable crystal oscillator 27 feeds a suitable frequency signal, $f_c = f_x \pm 50$ kc., into the second mixer 26 for beating the carrier frequency $f_x$ down to a substantially lower carrier frequency, such for example as 50 kc.s., more suitable for improved discriminator sensitivity design. Oscillator 27 may be made manually tunable over a small kilocycle range to provide compensation for any possible drift in the frequency $f_x$ generated by oscillator 17 of the airborne transponder 11. The intermediate frequency output signal $f_{ii}$ from the second mixer; i.e., $f_{ii} = f_x - f_c + f_{pa} + f_{as} - f_{ps}$, is fed through an I.F. amplifier 28, incorporating several stages of amplitude limiting, to a discriminator, or ratio detector, circuit 29 center tuned to a frequency 50 kc.s. and having a relatively large conversion ratio, such for example as 20 volts per kc.s. It is to be understood that the stages 26, 27 and 28 for converting the first I.F. frequency signal $f_i$ to a second I.F. frequency signal $f_{ii}$ may be eliminated and the discriminator 29 directly coupled to I.F. amplifier 25 in telemetering applications wherein substantially larger than 1 kc.s. deviations are obtainable. No particular advantage is realized from setting the frequency of crystal oscillator 27 above or below the transponder oscillator frequency $f_x$. As illustrated in FIGS. 5a and 5b which illustrate the recorded Doppler curve for $f_c < f_x$ and $f_c > f_x$, respectively, the recorded curves are merely inverted.

The discriminator output signal, which is a potential having a magnitude proportional to the frequency of $f_{pa}$, is fed through a low pass filter 31 to a single channel curve plotter 13 which records the frequency vs time curve from which the miss distance and relative velocity may be readily and accurately determined by comparison with an ideal Doppler frequency curve superimposed thereon. A preferred recorder, or curve plotter, 13 for analyzing a Doppler curve plot is disclosed in the copending application of Rodney E. Grantham, Navy Case No. 19,843, Serial Number 759,107, filed September 4, 1958. The low pass filter 31 is employed to reject any frequency components in the discriminator output signal higher than a particular magnitude, such for example as 50 c.p.s., which do not significantly contribute to the accuracy of the information provided by the Doppler curve plot.

Figure 6:
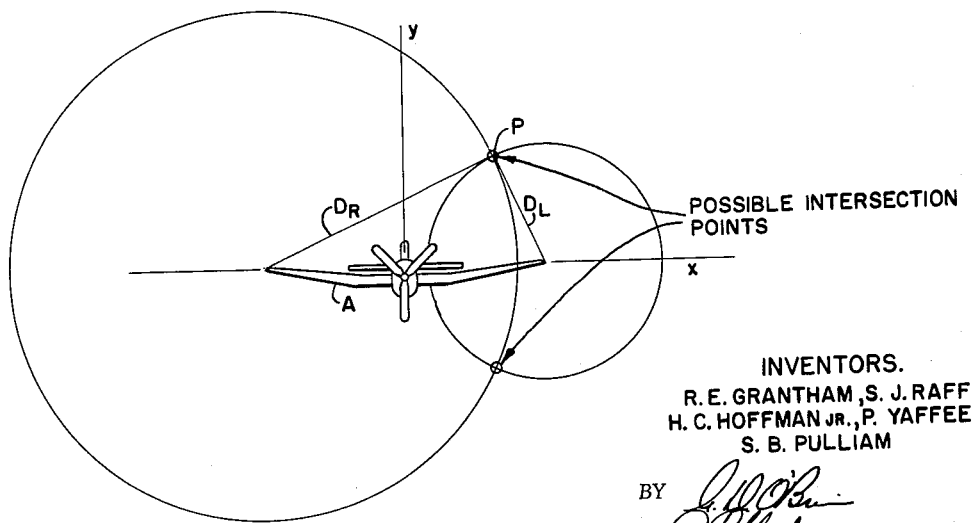
FIG. 6 is a geometric illustration of additional underlying principles of the present invention.

Although the single Doppler curve plot provided by the single channel telemetering system of FIG. 3 to the curve plotter 13 is adequate for the determination of the magnitudes of the miss distance and relative velocity between the target, or drone, aircraft A and the projectile, or missile P, it may be desirable in certain instances to determine the "positioning" of the miss distance relative to the drone aircraft in a particular $xy$ plane. Referring to FIG. 6, it will be apparent to those skilled in the art to which the instant invention relates that this determination may be accomplished by mounting a receiving antenna on each wingtip, and obtaining independent plots of $f'_{pa}$ and $f''_{pa}$ representative of the miss distance from the left wingtip, $D_L$, and from the right wingtip, $D_R$, respectively. A preferred antenna arrangement for this purpose is disclosed in the copending application of Rodney E. Grantham, Serial Number 634,800, filed January 17, 1957. Application of the mathematical analysis and definitions hereinbefore set forth relative to the Doppler shift signal $f_{pa}$ to the Doppler shift signals $f'_{pa}$ and $f''_{pa}$ results in the expressions $$f'_{pa} = \frac{-V_r^2}{\lambda p} \frac{(t-t_d)}{\sqrt{V_r^2(t-t_d)^2 + D_L^2}}$$

$$f''_{pa} = \frac{-V_r^2}{\lambda p} \frac{(t-t_d)}{\sqrt{V_r^2(t-t_d)^2 + D_R^2}}$$

for the information contained in the Doppler signals to be telemetered to the monitoring station.

Figure 7:
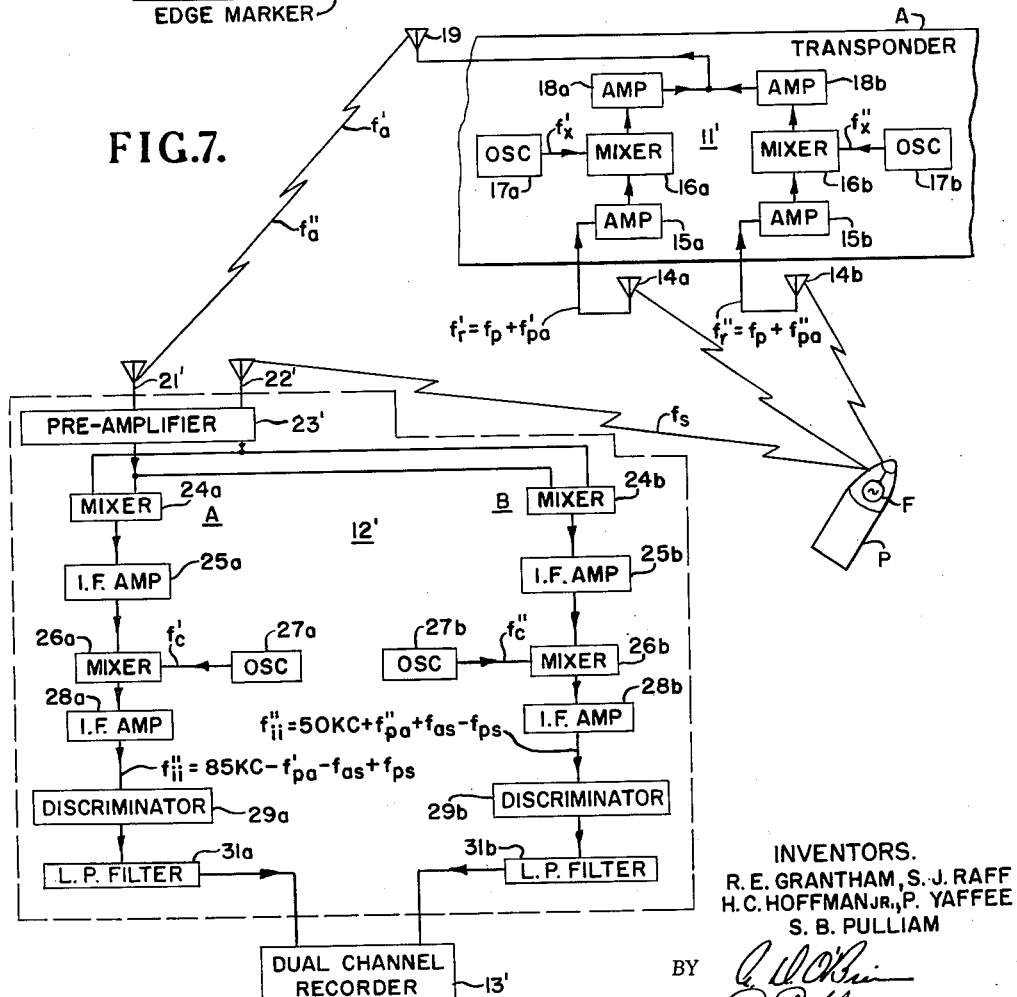
FIG. 7 is a block diagrammatic view of a dual channel embodiment of the instant invention.

Referring now to FIG. 7, there is shown thereon a dual channel embodiment of the instant invention for telemetering the Doppler shift frequency signals $f'_{pa}$ and $f''_{pa}$ received from a projectile proximity fuze F by the wing tip antennas of aircraft A to a monitoring ship, or station, S. As in the single channel system, the dual channel system includes a transponder unit 11' mounted in the drone aircraft A for intercepting the electromagnetic signal $f_p$ emanating from the proximity fuze F of projectile P, and an FM receiver 12' and recorder, or curve plotter, 13' located at the remote monitoring ship, or station, S. The transponder unit 11' consists of right and left wingtip antennas 14a and 14b, respectively, each being coupled through an amplifier 15a and 15b, respectively, having by way of example 10 mc.s. bandwidths, to mixers 16a and 16b. Individually coupled to mixers 16a and 16b are stable crystal oscillators 17a and 17b, respectively, each developing a carrier signal of a different frequency; namely, $f'_x$ and $f''_x$, respectively such for example as 69.915 mc. and 70.050 mc., respectively. The signal intercepted by each of the wingtip antennas; i.e., $f'_r = f_p + f'_{pa}$ and $f''_r = f_p + f''_{pa}$, is mixed with the carrier signal associated with the mixer to which the antenna is coupled. The output signal from each mixer 16a and 16b is translated through an output amplifier 18a and 18b, respectively, and then combined linearly and fed to a common transponder telemetering antenna 19. Each of the output amplifiers is tuned to pass only one sideband, assuming for illustrative purposes, the upper sideband, of the mixer output signal applied thereto, hence the resultant output signal of the transponder unit 11' consists of the output signals from both transponder channels; namely $f'_a$ and $f''_a$ where $f'_a = f'_x + f'_{pa} + f_p$ and $f''_a = f''_x + f''_{pa} + f_p$.

The receiver 12' at the monitoring station includes a pair of receiving antennas 21' and 22' for respectively receiving the signals $f'_a$, $f''_a$ and $f_p$ emanating from the transponder unit 11' and projectile fuze F, respectively. As set forth hereinbefore, each of the received signals $f'_t$, $f''_t$ and $f_s$ includes a Doppler frequency shift signal $f_{as}$ and $f_{ps}$, respectively, and may be mathematically indicated as $$f'_t = f'_x + f_p + f'_{pa} + f_{as}$$
$$f''_t = f''_x + f_p + f''_{pa} + f_{as}$$

and, $$f_s = f_p + f_{ps}$$

Figure 8:
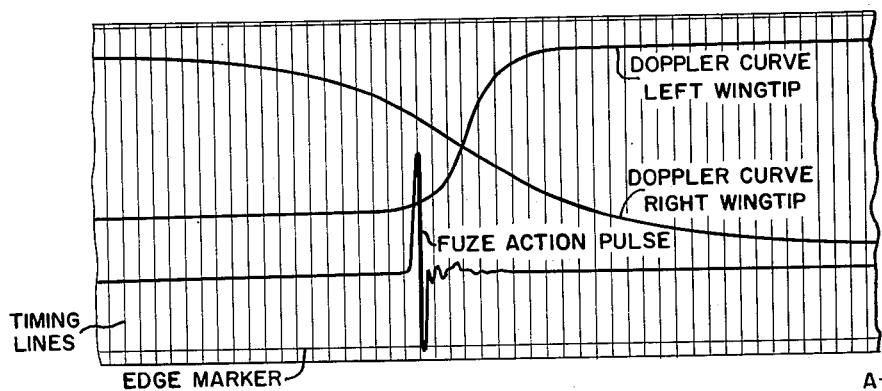
FIG. 8 is a graphical illustration of a Doppler frequency signal plot associated with FIGS. 7 and 9.

The received signals are translated through a broad band pre-amplifier stage 23' to a pair of identical receiving channels "A" and "B." Each channel includes a first mixer stage, wherein the received signals are heterodyned, the signal $f_s$ serving as the local oscillator signal, and a tuned I.F. amplifier, or filter, having by way of example a 70 mc.s. center frequency, a second mixer and associated local oscillator, a second I.F. amplifier, discriminator, and low pass filter, indicated by reference characters 24a—24b, 25a—25b, 26a—26b, 27a—27b, 28a—28b, 29a—29b, and 31a—31b, respectively. It is to be understood, however, that instead of separate mixers 24a and 24b and I.F. amplifiers 25a—25b, a common first mixer and first I.F. amplifier may be employed. Local oscillators 27a and 27b are each crystal stabilized and individually tunable to produce carrier frequency signals $f'_c$ and $f''_c$ respectively, equivalent to the carriers $f'_x$ and $f''_x$, respectively, of the airborne transponder unit 11', i.e., 70 mc.s. This tunable feature allows for manual compensation for slight differences in the transponder oscillator frequencies and drift rates. The carrier frequency signals $f'_c$ and $f''_c$ are fed to mixers 26a and 26b, respectively, wherein by heterodyning action with the intermediate frequency output signal from amplifiers 25a and 25b, respectively, and subsequent transmission through tuned intermediate frequency amplifiers 28a and 28b, respectively, second intermediate frequency signals $f'_{ii}$ and $f''_{ii}$ of substantially lower carrier frequencies are developed. The I.F. amplifiers 28a and 28b are tuned to divers frequencies in a manner to separate the Doppler shift signals $f'_{pa}$ and $f''_{pa}$ received by the left and right wingtip antennas 14a and 14b, respectively. Inasmuch as the difference, or beat, frequency between carriers $f'_x$ and $f'_c$ is 85 kc.s., and between carriers $f''_x$ and $f''_c$ is 50 kc.s., amplifiers 29a and 29b may be conveniently tuned to 85 kc.s. and 50 kc.s., respectively, thereby developing second intermediate frequency signals $f'_{ii}$, consisting of 85 kc.s. $-f'_{pa} - f_{as} + f_{ps}$, and $f''_{ii}$, consisting of $$50 \text{ kc.s.} + f''_{pa} + f_{as} - f_{ps}$$

respectively. Coupled to the outputs of I.F. amplifiers 28a and 28b are discriminators 29a and 29b respectively, each center tuned to the pass band frequency of the I.F. amplifier with which associated. The amplitude varying output signals of discriminators 29a and 29b are fed through low pass filters 31a and 31b to individual potential responsive recording channels of dual channel recorder 13'. Since the potential amplitude of the output signals of discriminators 29a and 29b are correlative to the instantaneous magnitude of the Doppler shift frequency signals $f'_{pa}$ and $f''_{pa}$, respectively, each channel of recorder 13' will plot a frequency vs. time curve from which the miss distances $D_L$ and $D_R$ may be accurately determined as hereinbefore described, and the x—y coordinates of the projectile P relative to the aircraft A in the target plane at time $t_d$ indicated although there will be ambiguity in the sign of the y coordinate. It may be seen by reference to FIG. 8 that the Doppler curves representative of $D_L$ and $D_R$ can be readily identified from the record inasmuch as the curve for $D_L$ increases with time $t$ while the curve for $D_R$ decreases with time $t$.

Figure 9:
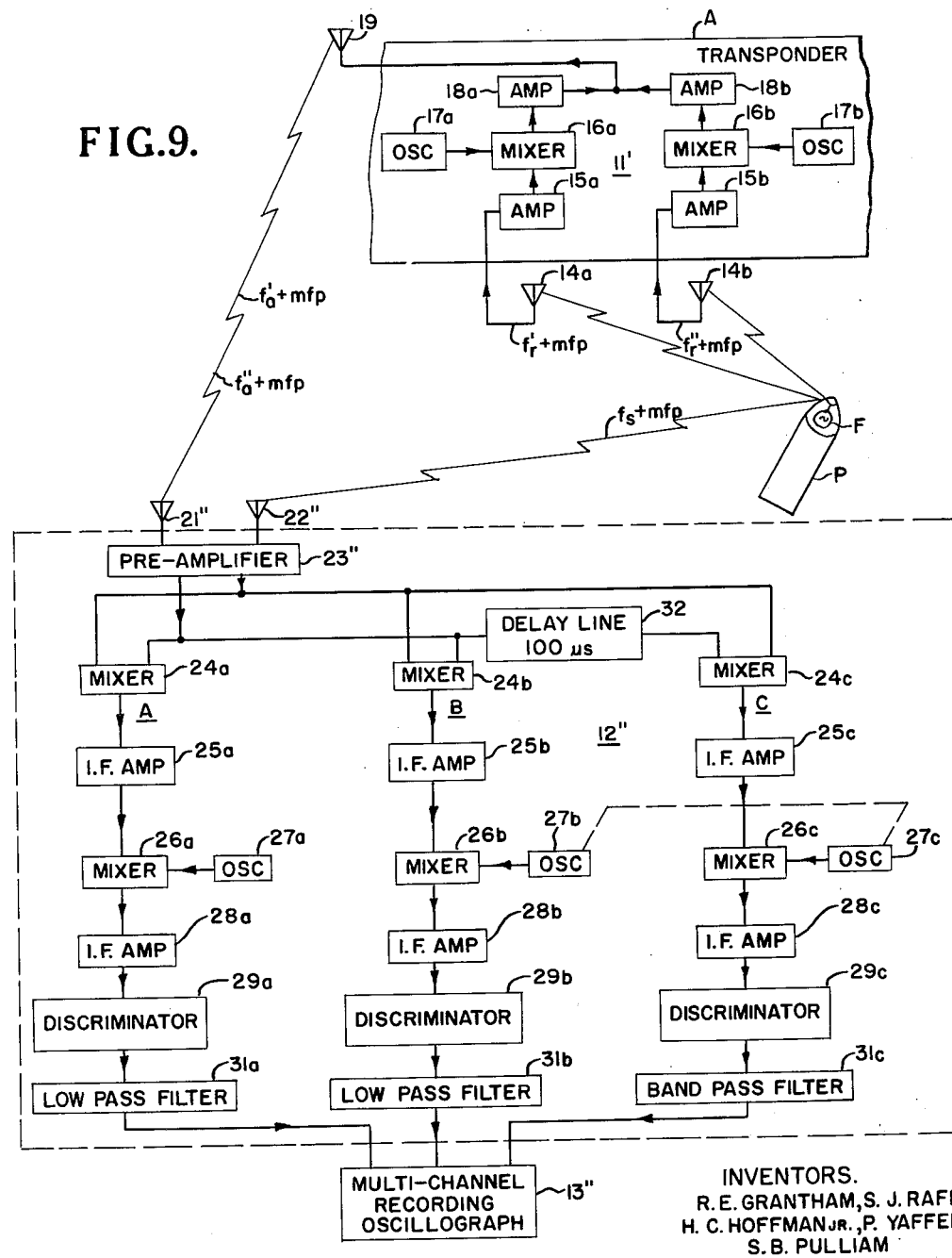
FIG. 9 is a block diagrammatic view of an alternative arrangement of the embodiment of FIG. 7.

In certain miss distance measurements involving proximity fuzes, it is desirable to be able to determine the distance from the point of closest approach to a target to the point where the proximtiy fuze will ignite the primer of the projectile. In the case of an inert loaded, or test, projectile, this determination is readily made by analysis of a record illustrating the time at which the fuze signal $f_p$ is frequency modulated by the mechanical shock resulting from the ignition of the small fuze primer. In order to effect recordation of this frequency shift signal, $m_{fp}$, a third receiving channel and recording channel is included in the monitoring station receiver and recorder units, as more clearly shown in FIG. 9. The third receiving channel is substantially identical to the other two receiving channels and includes a first mixer 24c, a first I.F. amplifier 25c, a second mixer 26c and associated local oscillator 27c, a second I.F. amplifier 28c, a discriminator 29c, and a band pass filter 31c. Since the FM modulated fuze signal $f_p$, namely $m_{fp}$, appears in both signals received by antennas 21" and 22" i.e., $f'_t$, $f''_t$ and $f_s$, respectively, a delay line 32 is introduced into the path of signals $f'_t$ and $f''_t$ from the transponder to prevent possible cancellation of the frequency modulated fuze frequency $f_p$. In practice, it has been found preferable to insert a delay line 32, such as an acoustic delay line having a 100 microsecond delay and operating at a center frequency of 40 megacycles, before the first mixer 24c to prevent the possibility of suppression of the frequency modulated fuze action signal. Inasmuch as both transponder transmitted signals $f'_t$ and $f''_t$ contain the frequency modulated, or shifted, proximity fuze frequency signal, either of these signals may be utilized by channel "C" to transmit the fuze action signal to recorder 13". For illustrative purposes, channel "C" may be assumed to be responsive to the second intermediate frequency signal of channel "B" whereupon the second I.F. amplifier 28c and discriminator 29c are tuned to 50 kc.s. The output signal of channel "C" is passed through the band pass filter 31c instead of the usual low pass filters 31a and 31b for effecting suppression of the Doppler curve and translation of the frequency modulated impulse correlative to proximity fuze action. The recorded fuze action trace is shown on FIG. 8 of the drawings.

Whereas the instant invention has been described with reference to the transmission of information at certain specific frequencies relating to aerial ordnance studies, it will be obvious to one skilled in the art to which the instant invention relates that it is not so limited, and may be advantageously employed for other similar applications than as herein specifically described.

Obviously many modifications and variations of the present invention are possible in the light of the above teachings. It is therefore to be understood that within the scope of the appended claims the invention may be practiced otherwise than as specifically described. What is claimed as new and desired to be secured by Letters Patent of the United States is:

1. A communications system for telemetering a signal correlative to the distance variations between a projectile in flight and a moving simulated aerial target comprising, in combination, circuit means in the projectile for emitting a continuous wave signal during the flight of said projectile, circuit means in the simulated target for intercepting said signal and for heterodyning said signal with a particular carrier frequency signal thereby deriving for transmission a telemetering signal correlative to the sum or difference of the intercepted signal and said particular carrier signal, a remote monitoring station having circuit means for receiving and mixing said telemetering signal and the continuous wave signal from said projectile, circuit means responsive to the output signal of said last named circuit means for developing an output signal correlative therewith, and means for recording said last named output signal.

2. A communications system for telemetering a signal correlative to the instantaneous distance variations between a moving simulated aerial target and an inert projectile in flight comprising, in combination, circuit means in the projectile for radiating a normally unmodulated continuous wave signal during the flight of said projectile and for modulating said signal at a predetermined proxmate distance from the aerial target, circuit means in said aerial target receptive to said radiated signal and for heterodyning said radiated signal with a predetermined carrier signal thereby deriving for transmission a telemetering signal correlative to the sum or difference of said radiated signal and said carrier signal, a remote recording station having circuit means for receiving and mixing said telemetering signal from said aerial target and said radiated signal from said projectile, discriminator circuit means for producing an output signal the magnitude of which is correlative to the instantaneous product resulting from the mixing of said telemetering and radiated signals, and means for recording said output signal.

3. A communications system according to claim 2 wherein said circuit means in the projectile comprises a proximity fuze.

4. A communications system according to claim 2 wherein said circuit means in the aerial target comprises transponder.

5. A communications system according to claim 2 wherein said circuit means at the remote recording station further includes circuit means for selectively reducing the frequency of said received and mixed telemetering and radiated signals.

6. A communications system for telemetering a signal correlative to the instantaneous distance variations between a moving drone aircraft and an inert projectile in flight comprising, in combination, circuit means in the projectile for radiating a continuous wave signal during the flight of said projectile; a transponder arranged in the drone aircraft, said transponder including a first antenna for intercepting said radiated signal plus a Doppler frequency shifted component thereof, a stable carrier frequency signal source, a mixer for combining the intercepted signal and said carrier signal, a turned amplifier for translating a selected portion of said combined signals, and a second antenna for transmitting said selected portion of said combined signals into space; and a remote monitoring station having receiving antennas for simultaneously receiving the signals transmitted from said transponder and radiated from said projectile, a first mixer circuit coupled to said receiving antenna for developing a first intermediate frequency signal correlative to said simultaneously received signals, a stable carrier frequency source, a second mixer coupled to said first mixer and to said source for developing a second intermediate frequency signal correlative to said simultaneously received signals, said second intermediate signal being of substantially lower frequency than said first intermediate signal, a discriminator coupled to said second mixer for developing an output signal having a polarity and magnitude correlative to the Doppler frequency shifted component of said intercepted signal, and a recorder coupled to said discriminator for graphically producing a trace of the output signal thereof.

7. A communications system according to claim 6 wherein said stable carrier frequency signal source of said transponder comprises a crystal controlled oscillator.

8. A communications system according to claim 6 wherein said stable carrier frequency source at said monitoring station comprises a crystal controlled oscillator tuned to a frequency which differs from the carrier frequency signal of said transponder by a predetermined amount.

9. A communications system according to claim 6 wherein said remote monitoring station includes an amplifier interposed between said second mixer and said discriminator for selectively amplifying said second intermediate frequency signal and for eliminating any amplitude modulation characteristics thereof.

10. A communications system according to claim 6 wherein said remote monitoring station further includes a filter interposed between said discriminator and said recorder for passing a predetermined portion of the discriminator output signal to said recorder.

11. A communications system for telemetering a pair of signals correlative to the instantaneous distance variations between an inert projectile in flight and two positions on a moving drone aircraft comprising, in combination, circuit means in the projectile for emanating a continuous wave signal during the flight of said projectile; a two channel transponder arranged in the drone aircraft, each of said channels including a first wingtip antenna for intercepting said emanated signal plus a Doppler frequency component thereof having an instantaneous magnitude proportioned to the instantaneous distance between the projectile and said antenna, a stable source of a preselected unique carrier frequency signal, a mixer for combining the intercepted signal and said carrier signal, a tuned amplifier for translating a selected portion of said combined signals, and a second antenna for radiating said selected portion of said combined signals; and a remote two channel monitoring station having receiving antenna means and a common broad band amplifier for simultaneously receiving and amplifying the pair of signals transmitted from said transponder and the signal radiated from said projectile, each of said monitoring station channels including a first heterodyning stage coupled to said common amplifier for developing a first intermediate frequency signal correlative to said simultaneously received signals, a second heterodyning stage including a local oscillator coupled to said first heterodyning stage for developing a substantially lower second intermediate frequency signal, said second intermediate frequency signal being divers for each of said channels, a discriminator coupled to said second heterodyning stage for developing an output signal having a polarity and magnitude correlative to said Doppler frequency component, and a recorder coupled to each of said discriminators for graphically plotting a trace of the output signal therefrom.

12. A communication system according to claim 11 wherein said stable carrier signal source of each transponder channel comprises a crystal controlled oscillator tuned to a predetermined divers carrier frequency.

13. A communications system according to claim 11 wherein said local oscillator of said second heterodyning stage of each of said monitoring station channels comprises a crystal controlled oscillator tuned to a predetermined divers frequency.

14. A communications system according to claim 11 wherein said discriminator in each of said monitoring station channels is center tuned to a predetermined divers frequency.

15. A communications system according to claim 11 wherein each of said monitoring station channels also includes an amplifier interposed between the second heterodyning stage and discriminator therein, each of said amplifiers having a divers pass band frequency responsive.

16. A communications system according to claim 11 wherein each of said monitoring station channels further includes a filter interposed between the discriminator and recorder thereof for translating a predetermined portion of the discriminator output signal to the recorder.

17. A communications system for telemetering a plurality of signals received by a moving drone aircraft and an inert projectile in flight comprising, in combination, circuit means in the projectile for radiating a normally unmodulated continuous wave signal during the flight of said projectile and for radiating a frequency modulated signal at a predetermined proximate distance of said projectile from the aircraft, a dual channel transponder arranged in the drone aircraft each of said channels having a wingtip antenna adapted to intercept said radiated signals including a Doppler frequency addition thereto, said Doppler addition being proportional to the instantaneous distance and relative velocity between said projectile and said antenna, a local oscillator tuned to a unique particular carrier signal frequency, a mixer for combining the intercepted signal and said carrier signal, a tuned amplifier for translating a selected portion of said combined signals, and a second antenna for transmitting said selected portion of said combined signals; and a remote three channel monitoring station having receiving antenna means and a common broad band amplifier for simultaneously receiving and amplifying the pair of signals transmitted from said transponder and the signal radiated from said projectile, each of said monitoring station channels having a first heterodyning stage coupled to said common amplifier for developing a first intermediate frequency signal correlative to the combination of said simultaneously received signals, a second heterodyning stage including a local carrier signal oscillator coupled to said first heterodyning stage for developing a second intermediate frequency signal correlative to the combination of said simultaneously received signals and said local carrier signal, a discriminator coupled to said second heterodyning stage for developing an output signal correlative to said Doppler frequency addition, a pass band filter coupled to said discriminator of a third one of said monitoring station channels for translating an output signal indicative of said radiated frequency modulated signal, and recorder means for individually plotting the output signals of each of said monitoring station channels.

18. A communications system according to claim 17 wherein a delay line is interposed between said common broad-band amplifier and said first heterodyning stage of said third one of said monitoring station channels.

19. A communications system according to claim 17 wherein said local carrier signal oscillator of a first one of said second heterodyning stage is divers from a second one of said second heterodyning stage, and said local carrier signal oscillator of said third one of said second heterodyning stage is substantially identical to said second one of said second heterodyning stage.

No references cited.